(12) United States Patent
Rolland et al.

(10) Patent No.: US 10,975,751 B2
(45) Date of Patent: Apr. 13, 2021

(54) METHOD FOR ESTIMATING A THAWED VOLUME PRESENT IN LIQUID FORM IN A TANK

(71) Applicant: Plastic Omnium Advanced Innovation and Research, Brussels (BE)

(72) Inventors: Jean-Philippe Rolland, Compiegne (FR); Sebastien Decamp, Compiegne (FR); Mamadou Saliou Balde, Remy (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 70 days.

(21) Appl. No.: 16/464,146

(22) PCT Filed: Nov. 30, 2017

(86) PCT No.: PCT/EP2017/081030
§ 371 (c)(1),
(2) Date: May 24, 2019

(87) PCT Pub. No.: WO2018/100087
PCT Pub. Date: Jun. 7, 2018

(65) Prior Publication Data
US 2020/0309012 A1    Oct. 1, 2020

(30) Foreign Application Priority Data
Nov. 30, 2016 (FR) ..................... 1661685

(51) Int. Cl.
*F01N 11/00* (2006.01)
*F01N 3/20* (2006.01)
*G01F 23/22* (2006.01)

(52) U.S. Cl.
CPC .......... *F01N 11/002* (2013.01); *F01N 3/2066* (2013.01); *G01F 23/223* (2013.01);
(Continued)

(58) Field of Classification Search
CPC .. F01N 11/002; F01N 3/2066; F01N 2610/02; F01N 2610/105;
(Continued)

(56) References Cited

U.S. PATENT DOCUMENTS 10,301,997 B2 * 5/2019 Rodatz .................. F01N 11/002
2003/0162063 A1   8/2003 Yoshizawa et al.
(Continued)

FOREIGN PATENT DOCUMENTS

CN       1639899 A     7/2005
CN     102733900 A    10/2012
(Continued)

OTHER PUBLICATIONS

International Search Report dated Mar. 29, 2018, in PCT/EP2017/081030 filed on Nov. 30, 2017.

*Primary Examiner* — Thai Ba Trieu
(74) *Attorney, Agent, or Firm* — Oblon, McClelland, Maier & Neustadt, L.L.P.

(57) ABSTRACT

A method for estimating a volume of thawed liquid in a motor vehicle tank, wherein the following operations are executed at regular time intervals: obtaining a temperature of the ambient air outside the tank using a thermometer; determining, according to said temperature outside the tank and by a first pre-established relation, a thermal energy transfer between the contents of the tank and the outside environment; determining, as a function of the power produced by a heating element, and by a second pre-established relation, a thermal energy transfer between the heating element and the contents of the tank; determining, as a function of the energy transfers, and by a third pre-established relation, an amount of thawed or refrozen liquid, during said time interval; the amounts of thawed and refrozen liquid are added during the preceding consecutive
(Continued)

time intervals to estimate a volume of thawed liquid present in the tank.

10 Claims, 2 Drawing Sheets

(52) U.S. Cl.
CPC .... *F01N 2610/02* (2013.01); *F01N 2610/105* (2013.01); *F01N 2610/1406* (2013.01); *F01N 2900/1631* (2013.01); *F01N 2900/1811* (2013.01); *F01N 2900/1814* (2013.01)

(58) Field of Classification Search
CPC ..... F01N 2610/1406; F01N 2900/1631; F01N 2900/1811; F01N 2900/1814; G01F 23/223
USPC .......................................................... 60/287
See application file for complete search history.

(56) References Cited

U.S. PATENT DOCUMENTS

| | | | |
|---|---|---|---|
| 2007/0035832 A1 | 2/2007 | Hirata et al. | |
| 2007/0251226 A1* | 11/2007 | Kaneko | F01N 3/208 60/317 |
| 2009/0078692 A1* | 3/2009 | Starck | F01N 3/2066 60/320 |
| 2009/0214397 A1* | 8/2009 | Shirono | F01N 3/2066 422/177 |
| 2010/0095653 A1 | 4/2010 | Thiagarajan et al. | |
| 2011/0027740 A1 | 2/2011 | Peucat et al. | |
| 2011/0067384 A1 | 3/2011 | Hirata et al. | |
| 2011/0067385 A1 | 3/2011 | Hirata et al. | |
| 2011/0210836 A1 | 9/2011 | Baumeister | |
| 2012/0315196 A1* | 12/2012 | Maus | F01N 3/2066 422/174 |
| 2014/0366512 A1* | 12/2014 | Hodgson | F01N 3/2066 60/286 |
| 2015/0128570 A1* | 5/2015 | Tomita | F01N 3/208 60/274 |
| 2015/0285119 A1* | 10/2015 | Bauer | F01N 3/2066 422/168 |
| 2016/0003120 A1 | 1/2016 | Tsuchiya et al. | |
| 2016/0356193 A1* | 12/2016 | Rodatz | F01N 11/002 |
| 2018/0214825 A1* | 8/2018 | Schneider | F01N 3/208 |
| 2020/0025055 A1* | 1/2020 | Balde | F01N 11/002 |

FOREIGN PATENT DOCUMENTS

| | | | | |
|---|---|---|---|---|
| DE | 102004061259 A1 * | 7/2006 | | F01N 11/002 |
| EP | 1 712 754 A1 | 10/2006 | | |
| EP | 2 940 284 A1 | 11/2015 | | |
| FR | 2 928 689 A1 | 9/2009 | | |
| FR | 2 935 112 A3 | 2/2010 | | |
| FR | 2 983 237 A1 | 5/2013 | | |
| JP | 2010-185334 A | 8/2010 | | |
| WO | WO-0030733 A1 * | 6/2000 | | B01J 12/007 |
| WO | WO 2014/042583 A1 | 3/2014 | | |
| WO | WO 2014/135951 A1 | 9/2014 | | |
| WO | WO 2017/077212 A1 | 5/2017 | | |

* cited by examiner

METHOD FOR ESTIMATING A THAWED VOLUME PRESENT IN LIQUID FORM IN A TANK

This application is a United States national stage application of International Application No. PCT/EP2017/081030, filed Nov. 30, 2017, which designates the United States, and claims priority to French Patent Application No. 1661685, filed Nov. 30, 2016 and the entire contents of each of the above applications are hereby incorporated herein by reference in entirety.

The present invention relates to heating devices mounted in tanks containing urea, and often used in motor vehicle exhaust gas "SCR" pollution control systems, or in tanks containing water, and used to supply the water injection systems of motor vehicle engines.

What is meant by an "SCR system" is a system for the catalytic reduction of NOx contained in the exhaust gases of an internal combustion engine, preferably of a vehicle, and using urea as a precursor of liquid ammonia.

What is meant by the term "urea" is any solution, generally an aqueous solution, containing urea. The invention yields good results with eutectic water/urea solutions for which there is a quality standard: For example, according to DIN 70070, in the case of the AdBlue® solution, also known by the English abbreviation DEF (Diesel Exhaust Fluid), the urea content is comprised between 31.8% and 33.2% (by weight) (namely 32.5+/−0.7% by weight) giving an available quantity of ammonia comprised between 18.0% and 18.8%. The Adblue solution freezes downward of a temperature of −11° C. The invention may also apply to urea/ammonium formate mixtures, likewise in aqueous solution, sold under the trade name Denoxium™, and of which one of the compositions (Denoxium-30) contains a quantity of ammonia equivalent to that of the Adblue® solution. These mixtures offer the advantage of not freezing until downward of −30° C. (as opposed to −11° C.) but have the disadvantages of corrosion problems associated with the potential release of formic acid.

Hence, in order to keep the pollution control system in an operational state during these periods of low temperatures, it is necessary to heat the tank containing the urea in order to obtain a sufficient volume of urea in liquid form and to be able to supply the device that pumps urea and injects it into the exhaust gases.

To this end, the tank is equipped with one or more heating elements, for example in the form of flexible sheets arranged on the lateral walls of the tank, or conforming to the shape of the bottom of the tank where the urea in liquid form primarily congregates.

The tank may also comprise submerged sensors, such as a level sensor of the mechanical float sensor type or an ultrasound level sensor for measuring the volume of liquid, or else a quality sensor using ultrasound or capacitive effect.

However, these devices do not make it possible to determine a quantity of liquid available when they are trapped in ice, something which may happen when the vehicle is stopped for an extended period, during which the heating device is not active, and during which the volume of urea contained in the tank freezes partially or completely.

It then becomes difficult, if not to say impossible, to determine the quantity of urea present in liquid form in the tank. Such information is of notable importance in deciding when to authorize activation of the injection device.

A first method for solving this problem is described in publication FR 2 928 689. According to that publication, the temperature inside the tank is measured at regular intervals, and when this temperature is above a certain threshold the metering pump is started, and when the output pressure is satisfactory, the urea injector is started.

Publication DE 10 2004 061259 proposes a similar strategy with a temperature probe arranged in the outlet pipe of the metering pump so as to ensure that the circuit is not blocked with frozen urea.

These methods do, however, have an implementational difficulty in that the temperature measurement is subject to wide variations and therefore gives very inaccurate indications. A more detailed study of the way in which urea thaws reveals the formation of air pockets, or of zones in which the liquid urea is mixed with solid lumps of ice, making the measuring of the temperature within the tank highly dependent on the zone in which the thermometer is located and on the thawing conditions in that zone. That results in high levels of uncertainty in the implementation of the method.

It is an object of the invention to propose, when the external temperature is particularly low and when the urea contained in the tank is partially or fully frozen, a method for evaluating a volume of thawed urea present in liquid form in the tank during the period following the starting of the vehicle.

This method relies on measuring the external temperature, and applies to tanks which may contain urea but also to any tank containing a liquid liable to freeze under winter conditions, said tank comprising heating elements.

The object of the method according to the invention is to estimate a volume of thawed liquid contained in a motor vehicle tank, said tank comprising at least one heating element. This estimated volume of liquid is at any instant in the implementation of the method less than or equal to the volume of liquid actually contained in the tank.

After having started the vehicle and when the at least one heating means is activated, the following operations are executed at regular time intervals:

Step A: using a thermometer arranged outside the tank, a temperature of the ambient air outside the tank is obtained, Step B: using a first preestablished relationship, a heat-energy transfer between the contents of the tank and the external surroundings is determined, Step C: using a second preestablished relationship as a function of the power produced by the at least one heating element, a heat-energy transfer between the at least one heating element and the contents of the tank is determined, Step D: as a function of the energy transfers determined in steps B and C, and using a third preestablished relationship, a quantity of liquid thawed or refrozen during this time interval is determined, Step E: the quantities of liquid thawed and refrozen during the preceding successive time intervals are summed in order to determine an estimated volume of thawed liquid present in the tank.

The invention proposes establishing a balance of the heat energy exchanges between the contents of the tank, which comprises the sum total of the volume of liquid and of the volume of ice, and the external atmosphere, on the one hand, and between the contents of the tank and the heating elements, on the other hand.

When this balance is positive, this leads to the production of an additional quantity of thawed liquid. When, under certain specific circumstances, this balance is negative, it is considered that a quantity of liquid has turned back into ice and it is deducted from the total quantity of liquid present in the tank.

Bearing in mind the uncertainties observed in measuring levels and temperatures during the thawing phase, the estimate of the volume of liquid present in the tank using the method that forms the subject of the present invention aims to determine a minimum liquid volume, which in any event is lower than the actual volume of liquid. This estimate is therefore based on experimental results in which approximations are systematically rounded to the most unfavorable situation.

The first preestablished relationship makes the heat energy dissipated toward the outside correspond with the external-temperature value alone and, optionally, with the vehicle speed, making it possible in that way to obviate the uncertainties associated with measuring the temperature inside the tank.

Likewise, the second preestablished relationship makes the heat energy received dependent on the electrical power of the heating element during the time interval considered.

And the third preestablished relationship makes a variation in the volume of liquid dependent on a balance of energy supplied to the tank during a given time interval.

This heat exchange calculation is therefore performed using relationships based on experimental measurements. These preestablished relationships may take the form of tables of values, curves, or mathematical relationships.

These three relationships are adjusted in such a way that the estimated volume is always lower than the volume actually present in the tank and observed during various experimental campaigns.

The method according to the invention may also comprise, individually or in combination, the following features:

After having started the vehicle and prior to executing step A for the first time, a temperature inside the tank is obtained using a thermometer placed inside said tank and, by comparing this initial temperature inside the tank against preestablished temperature thresholds, an initial volume in liquid form present in the tank, and a dead time at the end of which said step A is executed for a first time interval are determined, as a function of a time for which the vehicle is stopped and of a volume present in the tank at the start of said time for which the vehicle is stopped.

the value of the initial volume in liquid form present in the tank and of the dead time are determined in such a way that:

when the initial temperature inside the tank is above a first given threshold greater than or equal to a second given threshold, the initial volume is equal to an updated volume and the dead time is equal to zero, or when the initial temperature inside the tank is below said first given threshold, said heating means is activated, and when the initial temperature inside the tank is below a third given temperature threshold, the initial volume is equal to zero and the dead time is equal to a predetermined value, or when the initial temperature inside the tank is comprised between the third temperature threshold and a second given temperature threshold higher than the third threshold, and when an estimated volume of liquid present in the tank at the moment of the previous stopping of the vehicle is below a given threshold, the initial volume is equal to zero and the dead time is equal to said predetermined value, or when said estimated volume of liquid present in the tank at the moment of the previous stopping of the vehicle is above said given threshold, and when a time for which the vehicle has been parked is above a given threshold the value of the initial volume is equal to zero, and the dead time is equal to zero, or when said time for which the vehicle has been parked is below said given threshold, the initial volume is equal to the estimated volume of liquid present in the tank at the moment of the previous stopping of the vehicle decreased by a volume of liquid that has refrozen during the time for which the volume has been parked, and the dead time is equal to zero, In step E, the estimated volume of thawed liquid present in the tank is increased by the value of the initial volume, At the end of step E, and during a step F, a signal is obtained from a level sensor, and the validity of this signal is assessed, and when this signal is considered to be valid, an updated value for the volume of liquid present in the tank is evaluated using said level sensor, and the value of the estimated volume of thawed liquid obtained at the end of this time interval is replaced with said updated volume value, or when this signal is considered to be invalid, the value for the estimated volume of thawed liquid that was obtained at the end of this time interval is retained, and step A is executed again for a subsequent time interval.

During step B, a vehicle speed value is obtained, so that said first relationship is dependent on the external temperature and on said vehicle speed.

The first relationship making it possible to determine a heat-energy transfer between the contents of the tank and the external surroundings, the second relationship making it possible to determine a heat-energy transfer between the at least one heating element and the contents of the tank, and the third relationship making it possible to determine the quantity of liquid thawed or refrozen, are established experimentally.

The method of the invention is applied to a tank containing water or urea dissolved in water, or a ternary mixture made up of water, urea, and an alcohol.

The alcohol forming the ternary mixture is selected from alcohols such as methanol, ethanol, ethylene glycol or isopropanol.

The invention also relates to a device for storing liquid, comprising:

a storage tank comprising at least one heating element,
thermometers arranged inside and outside the tank,
one or more submerged sensors;
a means for measuring the speed of the vehicle,
an injection pump associated with a means for measuring an injected volume,
a computer processing unit connected by data interchange means to the temperature measurement means, the submerged sensor or sensors, the vehicle speed measuring means, the injected-volume measuring means, and comprising a data-storage means,
coded instructions loaded into the computer processing unit to enable the execution of the steps of the method according to one of the above features.

The invention will be better understood from studying the attached figures, which are provided by way of examples intended to support the present description and which are entirely unlimiting, in which.

By way of an example on which to base the description which follows, the invention will more specifically concern itself with a method for calculating the volume present in liquid form in a tank containing urea dissolved in water or in an alcohol. However, it should be emphasized that the elements of the method apply mutatis mutandis to any other tank containing a liquid liable to pass from a solid phase to a liquid phase under the temperature conditions observed during ordinary use of the vehicle in which the tank is installed.

Figure 1:
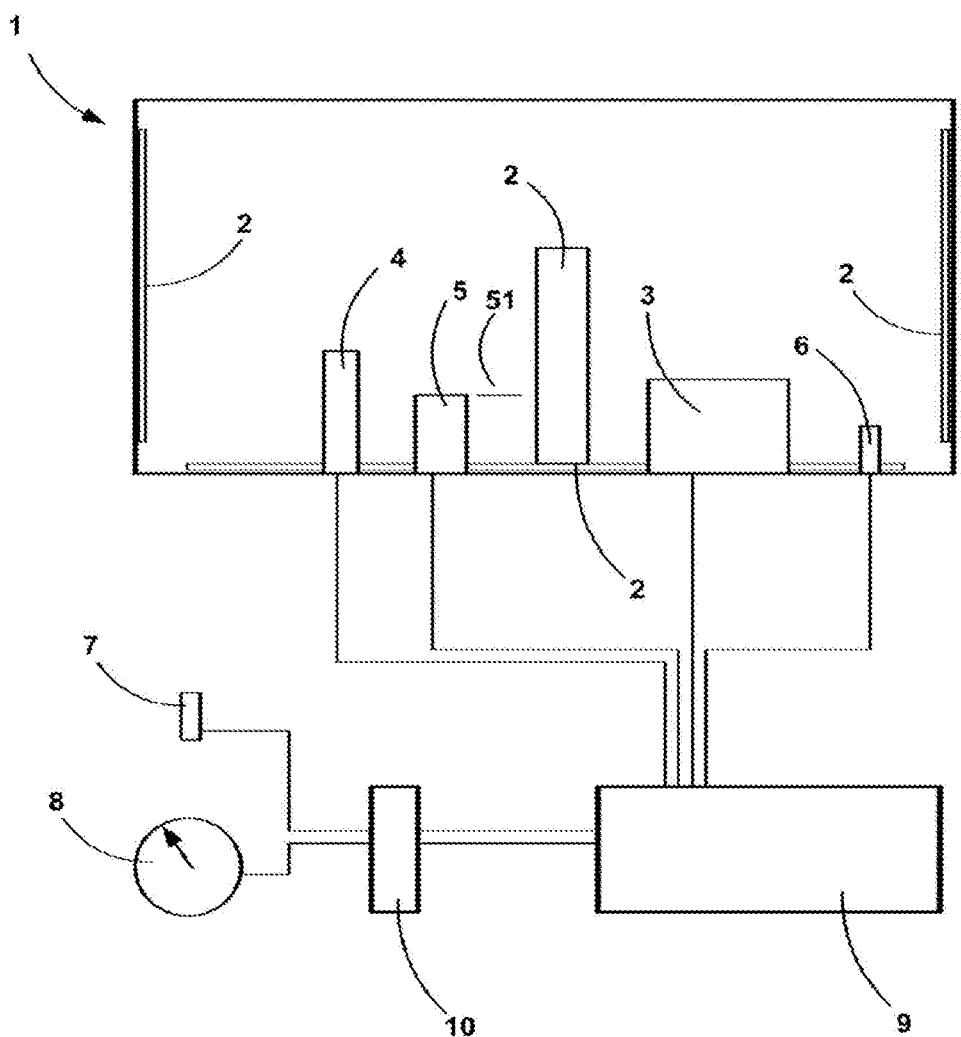
FIG. 1 is a schematic view of a tank.

FIG. 1 depicts a device for storing urea comprising a tank 1, inside which is arranged a plurality of heating elements 2 fixed, by way of example, to the lateral walls or to the bottom of the tank or else to the middle of the interior volume of the tank.

The tank may also contain submerged sensors such as a level sensor 4 or a quality sensor 5. These sensors have the particular feature of emitting a valid signal when immersed in a pocket of liquid contained in the tank and of emitting an incoherent signal or of not emitting any signal at all when trapped within frozen liquid.

The level sensor may be a capacitive effect sensor comprising measurement cells the electrical capacitance of which changes according to the liquid or solid state of the urea. The sensor may also be of the ultrasound type comprising a transducer positioned in such a way that the ultrasound produced by the transducer reflects off the interface separating the liquid from the gaseous (or solid) part sitting on top of the liquid. The reflected waves are analyzed by a reception means. When the sensor is trapped in urea in solid form, the echo generated by the reflection of the signal does not reach the reception means within a predetermined time interval, and the signal received is therefore considered to be invalid.

The level sensor may also be of mechanical type and comprise a float, the rise of which indicates the volume contained in the tank. When the float is blocked in the ice, it emits a constant signal considered to be invalid.

The quality sensor 5 operates in a similar way to the level sensor using ultrasound. The ultrasound emitted by the piezoelectric transducer reflects off a reflector 51, and makes a given number of outward-return trips between the reflector and the transducer, passing through the liquid on each pass. When the sensor is trapped in urea in solid form, the journey time of the sound wave does not reach the receiver in a predetermined time interval and the signal delivered is considered to be invalid.

Conversely, when one of these sensors provides a measurement considered to be valid, it is possible to deduce therefrom that the reservoir contains a minimum volume of liquid $V_{act}$. This updated volume $V_{act}$ may be the result of an estimate based on volume values stored in memory and acquired experimentally when the sensor is awakened, or indicative of the actual volume of liquid present in the tank when the entire contents of the tank are in phase liquid.

When the tank contains at least one of these level or quality sensors, referred to in the broadest sense as submerged sensors, it will be possible to make use of the signal delivered as will be explained in detail later on in this description.

The tank also comprises an injection pump 3 associated with a means of producing a signal indicative of the quantity of liquid injected in a given time interval, and a thermometer 6 making it possible to evaluate the temperature $\theta_{int0}$ of the liquid inside the tank. Once again it will be noted here that this temperature measurement is reliable when the entire contents of the tank are in liquid form.

The submerged sensors 4 and 5, the inside thermometer 6 and the injection pump 3 are connected to a computer processing unit 9.

The device also comprises a thermometer 7 external to the tank, positioned in the vehicle outside the passenger compartment and engine compartment proper, in order to measure the temperature $\theta_{exti}$ of the ambient air outside the vehicle and outside the tank, and a means 8 for measuring vehicle speed. As a general rule, these instruments are connected to the central processor 10 of the vehicle. The computer processing unit 9 therefore comprises a link to the central processor 10 in order to acquire the values of the external temperature and of the speed of the vehicle.

The computer processing unit contains a memory in which are stored coded instructions which, when executed by the processing unit, make it possible to execute the steps of the method according to the invention.

This software comprising said coded instructions may also be stored on a readable medium which is then loaded into said processing unit.

Figure 2:
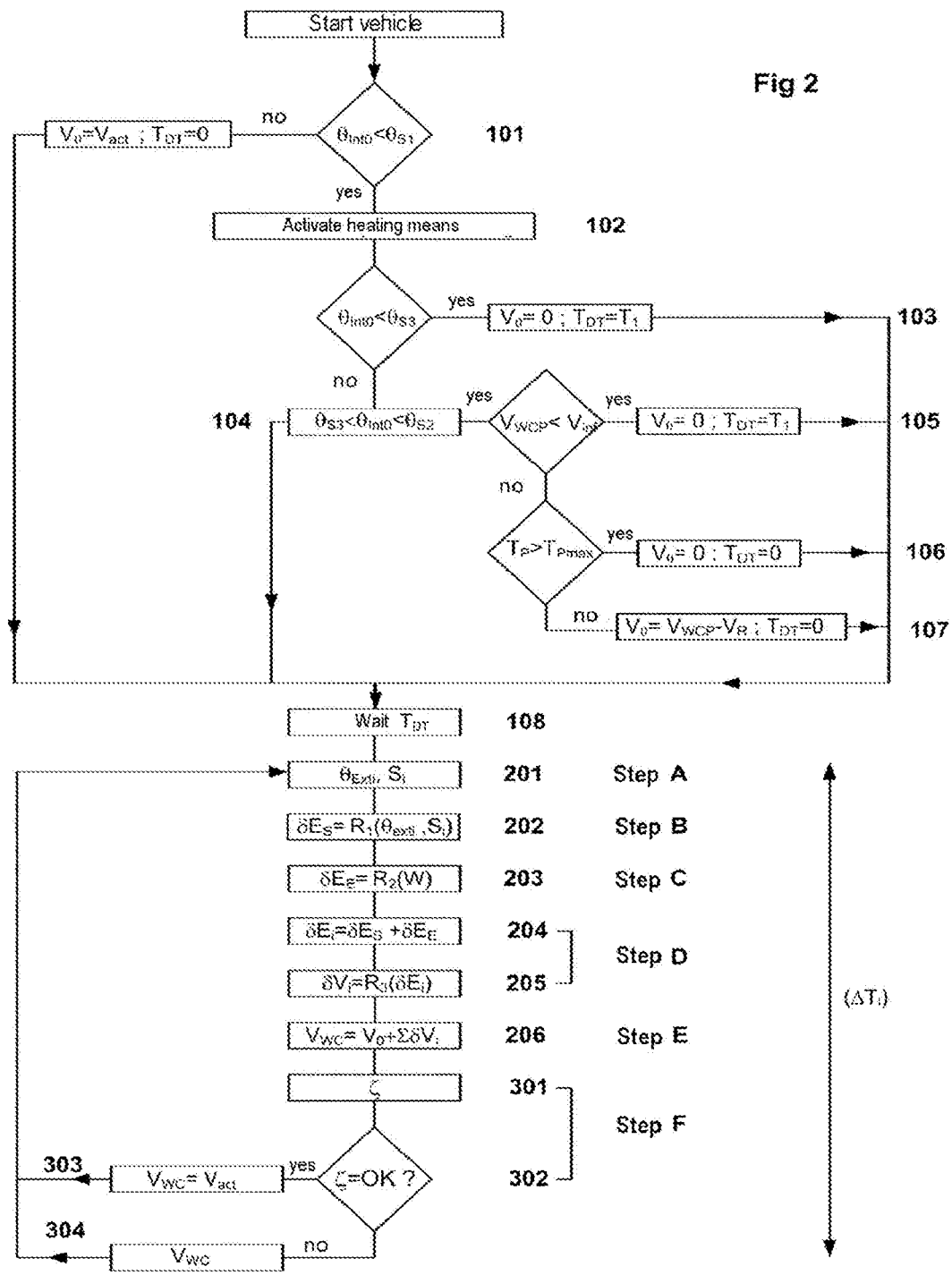
FIG. 2 is a flow diagram indicating the various steps in the implementation of the invention.

FIG. 2 is flow diagram detailing the various steps in implementing the method.

Implementation of the method involves two distinct phases. A first, reset, phase, during which the initial data at vehicle startup or after a short-term stoppage are determined, and formed of steps 101 to 107. This setup phase is succeeded by a phase of actually scrutinizing or evaluating the quantity of liquid present in the tank, and formed of steps A to E (201 to 206). This evaluation phase is executed in a loop at regular time intervals $\Delta T_i$.

Upon vehicle startup, when the ignition key is inserted and the units of the vehicle are activated, a value for the temperature $\theta_{int0}$ prevailing inside the tank is obtained using the thermometer 6. This initial internal temperature $\theta_{int0}$, even though its value can be considered to be very much compromised with errors when the tank is frozen or partially frozen, is, as a general rule, measured at a point close to the injection pump pickup point, and remains indicative of the temperature prevailing around this point and of the possible presence of liquid at this level.

When (101) the temperature inside the tank $\theta_{int0}$ is above a first given temperature threshold $\theta_{S1}$, the tank is considered to contain only liquid and the volume present in the tank is then measured directly using the submerged level sensor 4. It will be seen here that the measurement of this temperature is thus relatively reliable.

By way of example, for a tank containing urea, this first temperature threshold $\theta_{S1}$ may usefully be fixed at 5° C. Otherwise, the volume $V_0$ comprised in the tank is considered to be entirely in liquid form and equal to the value $V_{act}$ given by the level sensor 4. The method then passes on directly to the scrutinizing phase.

When the temperature inside the tank $\theta_{int0}$ is below this first temperature threshold $\theta_{S1}$, the heating elements 2 are activated (102).

The method therefore envisages a series of setup steps the purpose of which is to determine an initial volume of liquid $V_0$ present in the tank, and a dead time $T_{DT}$ used for delaying the start of the scrutinizing phase.

The value of the dead time $T_{DT}$ during which the starting of the scrutinizing phase during which an estimated volume of liquid is suspended is equal to a zero value or a non-zero value preestablished experimentally. When this value is non-zero it corresponds to the heating time $T_1$ needed for a first quantity of liquid to appear. By way of example, considering a temperature of −40° C., the value $T_1$ of the dead time is of the order of 5 to 6 minutes, depending on the power of the heating elements installed in the tank.

When (103) the initial temperature $\theta_{int0}$ inside the tank is below a third temperature threshold $\theta_{S3}$ corresponding, for example, to the thawing temperature, it will be considered that a significant proportion of liquid is in solid form and that the initial volume $V_0$ is equal to zero and that the dead time is equal to $T_1$. For the case of urea, this third threshold $\theta_{S3}$ corresponds to a temperature of −9° C.

When (104) the initial internal temperature $\theta_{int0}$ is comprised between a second threshold $\theta_{S2}$ and the third temperature threshold $\theta_{S3}$, it will be considered that the initial volume of liquid present in the tank is dependent on the estimated or actual volume $V_{WCP}$ the last time the vehicle was stopped. The value of the second temperature threshold $\theta_{S2}$ is generally equal to the value of the first threshold $\theta_{S1}$. For the case of urea, this second threshold $\theta_{S2}$ may usefully be fixed at 5° C.

If this volume $V_{WCP}$ is below a given threshold $V_{inf}$, then a prudent evaluation of the volume $V_0$ will be adopted, this volume then being considered to be zero. The dead time $T_{DT}$ is then equal to $T_1$ (105).

When the volume $V_{WCP}$ is above $V_{inf}$, a value is obtained for the time $T_P$ spent parked that has elapsed between the previous stopping and the restarting of the vehicle.

If (106) this time spent parked $T_P$ is above a given threshold $T_{Pmax}$ the value of the initial volume $V_0$ is then considered to be zero and the dead time $T_{DT}$ is equal to zero. This is because although the temperature $\theta_{int0}$ inside the tank is above the freezing point $\theta_{S3}$, the variations in temperature during the time spent parked are uncontrolled and do not make it possible to determine a value for the initial volume. By way of example, the threshold for the time spent parked $T_{Pmax}$ may beneficially be of the order of two hours.

If (107), the time spent parked $T_P$ is below the preestablished threshold $T_{Pmax}$, then it will be considered that, throughout the duration of the stop, the heating elements are deactivated and the contents of the tank receive no incoming energy ($E_E = \Sigma \delta E_E = 0$).

In order to calculate the value of the outgoing energy transferred between the contents of the tank and the external surroundings during the time spent stopped, an external temperature value that corresponds to the harshest conditions is adopted. In the specific case of urea, this temperature is equal, by way of example, to −40° C. Using a first relationship $R_i(\theta_{exti})$ that for a given time interval links an external temperature $\theta_{exti}$ and the heat-energy transfer $\delta E_S$ between the contents of the tank and the external surroundings, a total quantity of energy lost by the contents of the tank and which is negative, $E_S = \Sigma \delta E_S$ with $\delta E_S = R_1(-40° C.)$ is determined for the duration spent parked. The energy balance $E = E_E + E_S$ is a negative balance.

Use is then made of a third relationship $R_3(E)$ that links, for a given time interval, a balance of the energy exchanged between the contents of the tank and a quantity of liquid that has frozen or thawed. Because the energy balance is negative, the value obtained corresponds to a quantity of liquid $V_R$ that has refrozen during the time spent parked. This value $V_R$ then needs to be deducted from the value of liquid $V_{WCP}$ present in the tank at the time of the previous stop in order to form the value of the initial volume $V_0 = V_{WCP} - V_R$.

The strategy for determining the volume $V_0$ and the dead time $T_{DT}$ as detailed hereinabove comes from an experimental approach and may undergo numerous arrangements in which the number of significant temperature thresholds, in this instance equal to three thresholds, is increased or decreased. Likewise, the number and value of the thresholds adopted for the times spent parked may be adapted at will.

After having determined the initial volume $V_0$ present in liquid form in the tank and a dead time $T_{DT}$, and after having waited for a duration equal to said dead time (108), the method moves on to the scrutinizing phase during which the estimated volume of thawed liquid $V_{WC}$ present in the tank is estimated dynamically.

Under the action of the heating elements, the urea progressively changes from solid form to liquid form. Further, under certain circumstances, it is also possible to see urea reappear in solid form.

The evaluation phase may then begin to be executed in a loop.

Beginning with the first time interval $\Delta T_1$, and then at successive regular and constant time intervals $\Delta T_i$, during a step A (201), the value of the temperature $\theta_{exti}$ of the ambient air prevailing outside the tank and indicative of the temperature outside the vehicle is acquired using the thermometer 7 arranged outside the tank.

During a step B (202), a value of the outgoing energy $\delta E_S$ exchanged during this time interval between the contents of the tank and the external surroundings is determined using the first relationship $R_1(\theta_{exti})$. Optionally, it is advantageous also to take account of the vehicle speed $S_i$ in order to improve the precision with which this exchange is evaluated. A value for the loss $\delta E_S = R_1(\theta_{exti}, S_i)$ is obtained. When this speed is not known it is considered by default that the vehicle is running at high speed, for example at 140 km/h, so that the energy loss is increased by default. This energy transfer $\delta E_S$ is a loss, and therefore has a negative value.

The relationship $R_i(\theta_{exti})$ is a relationship preestablished experimentally following campaigns of measurements, linking the external temperature $\theta_{exti}$ with the quantity of energy $\delta E_S$. Optionally, it may be advantageous to take the vehicle speed $S_i$ during the time interval $\Delta T_i$ considered into consideration. The relationship $R_1$ then becomes a relationship of the type $R_1(\theta_{exti}, S_i)$. The results obtained are specific to the shape of the tank and to where it is sited within the vehicle, and to the nature of the liquid contained in the tank. This relationship $R_1(\theta_{exti})$ may take the form of a table of results, of curves or else of mathematical formulae stored in the memory of the computer processing unit 9.

The energy value adopted is the value that corresponds to the most severe winter conditions so that the corresponding energy loss is the maximum loss likely to be observed.

Next, in step C (203), the value of the energy transferred to the contents of the tank by the heating elements 2 is determined using a second relationship $R_2(W)$. This value is dependent on the power W delivered by the heating elements. $\delta E_E = R_2(W)$ during the time interval $\Delta T_i$. This incoming energy transfer has a positive sign. It will be noted here that the power delivered by the heating elements may vary according to the power available in the battery. Likewise, when the vehicle is fitted with the "Stop and Start" function, certain manufacturers deactivate the heating elements in order to avoid excessive electricity consumption.

The relationship $R_2(W)$ is also a relationship that is preestablished experimentally following measurement campaigns carried out according to the heating power incorporated into the tank. The results obtained are specific to a given shape of tank, and to the nature of the liquid contained in the tank. This relationship $R_2$ may take the form of a table of results, curves or even of mathematical formulae stored in the memory of the computer processing unit 9.

In step D (204), the balance of total energy transferred to the contents of the tank during the time interval $\Delta T_i$ considered, and $\delta E_i = \delta E_E + \delta E_S$, is calculated.

This balance is positive as a general rule, which means that the quantity of energy transferred to the liquid accelerates the thawing. However, when the power of the heating elements is deliberately limited in order to save battery, or else under certain cold conditions not representative of realistic conditions, it is possible to see negative balances leading to a quantity of liquid freezing.

Next (205), using the third relationship $R_3(\delta E_i)_1$ the quantity of liquid $\delta V_i$ that has frozen or thawed during the time interval $\Delta T_i$ is calculated according to the energy balance $\delta E_i$ obtained.

The relationship $R_3(\delta E_i)$ is also obtained experimentally by cross comparison of the results of the previous two experimental campaigns.

These experimental measurements include variable heating powers. The quantity of liquid obtained is measured in order to determine the energy actually transferred to the contents of the tank, by considering that the energy exchanged with the external surroundings corresponds to the relationship $R_1(\theta_{exit})$ and that the relationship $R_2(W)$ corresponds to the energy supplied by the heating elements. In a similar way to the relationships $R_1(\theta_{exit})$ and $R_2(W)$, the relationship $R_3(\delta E_i)$ may take the form of tables, curves or mathematical relationships stored in the memory of the computer processing unit. The relationship $R_3(\delta E_i)$ adopted is the one that corresponds to the most severe conditions (endogenic and environment conditions), so that the true thawing efficiency will always be higher than the assumed efficiency.

This elemental volume is either positive, if the quantity of energy supplied is sufficient to thaw the urea, or negative if, during the time period considered, some ice has re-formed.

In step E (206), the estimated total volume $V_{WC}$ of thawed liquid present in the tank $V_{WC} = V_0 + \Sigma \delta V_i$, is calculated.

As has been indicated hereinabove, the experimental relationships $R_1(\theta_{exti})$, $R_2(W)$ and $R_3(\delta E_i)$ have been determined so that the estimated quantity of liquid is a quantity deliberately estimated by default and lower than the quantity of liquid actually present in the tank.

Hence, it may seem advantageous to make use of the volume indications provided by the submerged sensors.

During a step F, after having calculated the value $V_{WC}$, a signal $\zeta$ is obtained (301) from one or more submerged sensors. According to the arrangements explained above, the validity of this signal is estimated (302). What is understood here as being valid is that this signal is characteristic of the behavior of the submerged sensor in a pocket of liquid. Contrastingly, a signal that is invalid means that the signal is characteristic of the behavior of the sensor when the sensor is trapped in ice.

When this signal coming from the level sensor 4 is considered to be valid (303), then an estimated or actual value $V_{act}$ of the volume of liquid present in the reservoir is determined and this value is substituted for the value $V_{WC}$ previously calculated. This value $V_{act}$ may therefore represent the actual value of liquid present in the tank and measured by the submerged level sensor 4 or alternatively may represent a value estimated from values, determined by tests and stored in memory, correlating the signal from the sensor with the default quantity of liquid present in the tank.

As has already been mentioned, the relationship $R_1$, $(\theta_{exti})$, the relationship $R_2(W)$ and the relationship $R_3(\delta E_i)$ are relationships obtained experimentally which make it possible to determine the value $V_{WC}$ and which are established in such a way as to give a liquid volume value estimated by default. This value $V_{WC}$ is therefore, in practically all instances, lower than the value $V_{act}$ which is itself lower than or equal to the value of the volume of liquid actually contained in the tank.

When the signal $\zeta$ is not considered to be valid (304), the value $V_{WC}$ obtained is retained.

The method continues by resuming acquisition of an external temperature $\theta_{exti}$ for a subsequent time interval $\Delta T_{i+i'}$.

It will be noted that, when the tank contains a sufficient quantity of liquid for the level sensor to provide a valid indication corresponding to the value of the volume of urea in liquid form actually present in the tank and equal to the updated value $V_{act}$, the estimated value $V_{WC}$ is replaced, in each time interval, by the updated value $V_{act}$, and therefore remains limited to that value. The method can therefore be applied without interruption.

It may also be considered that it is no longer necessary to continue to calculate the estimated value of the volume of liquid $V_{WC}$ when the temperature inside the tank $\theta_{int}$ is above the first temperature threshold $\theta_{S1}$. In that case, it becomes necessary to acquire a value $\theta_{int}$ for the temperature inside the tank when, for example, the estimated value $V_{WC}$ is replaced in several successive time intervals by the updated value $V_{act}$.

As has already been mentioned, how the laws R1, R2, R3 are determined is dependent on the shape and siting of the tank and also on the nature of the liquid contained therein. Although the foregoing description discloses a tank containing urea, it is entirely possible to adapt the method to a tank containing water, urea dissolved in water, or what is commonly referred to as a ternary mixture, containing urea, water and an alcohol.

The alcohol that forms the ternary mixture may beneficially be selected from alcohols such as methanol, ethanol, ethylene glycol or isopropanol.

In the case of a tank containing urea used to treat exhaust gases, knowing the estimated volume $V_{WC}$ of liquid present in the tank allows the injection pump connected to the gas treatment device to be activated as early on as possible or, conversely, makes it possible to limit this throughput in the event of there being insufficient liquid in the tank. When the pump is activated, care is taken to determine the quantity of liquid $V_{Inj}$ injected, so as to deduct this volume from the volume of thawed liquid $V_{WC}$ calculated according to the above method. The new value for the volume of liquid $V_{WC}'$ is then equal to $V_{WC} - V_{Inj}$. So, the method according to the invention makes it possible as early on as possible and as effectively as possible to manage an exhaust gas treatment strategy when the vehicle is experiencing extremely low temperature conditions.

The method described hereinabove therefore makes it possible to provide a dynamic and evolving model for the management of a tank containing a liquid liable to freeze under normal conditions of use while at the same time circumventing uncertainties regarding the measuring of the temperature inside the tank.

KEY TO PARTS

1 Tank.
2 Heating element.

3 Injection pump.
4 Submerged level sensor.
5 Submerged quality sensor.
51 Reflector.
6 Thermometer arranged inside the tank.
7 Thermometer arranged outside the tank.
8 Means for measuring vehicle speed.
9 Computer processing unit.
10 Vehicle central computer.
101 to 108 Setup: determining the volume $V_0$ and the dead time $T_{DT}$.
201 to 206 Determining the estimated quantity of liquid present in the tank.
301 to 303 Updating the estimated volume of liquid.
$\delta E_S$ Transfer of heat energy between the contents of the tank and the external surroundings during the time interval $\Delta T_i$.
$\delta E_E$ Transfer of heat energy between the heating elements and the contents of the tank during the time interval $\Delta T_i$.
$\delta E_i$ Balance of energy exchanged with the contents of the tank during the time interval $\Delta T_i$.
$R_1$ First preestablished relationship linking the external temperature ($\theta_{exti}$) and the heat-energy transfer ($\delta E_S$) between the contents of the tank and the external surroundings.
$R_2$ Second preestablished relationship linking the power (W) produced by the heating elements and a heat energy transfer ($\delta E_E$) between the heating elements and the contents of the tank.
$R_3$ Third preestablished relationship linking the energy balance ($\Delta E$) and the quantity ($\delta V_i$) of liquid thawed or refrozen.
$S_i$ Vehicle speed during the time interval $\Delta T_i$ considered.
$T_{DT}$ Dead time.
$T_1$ Preestablished non-zero duration.
$\Delta T_i$ Time intervals.
$\Delta T_1$ First time interval during which step A is executed.
$T_P$ Time spent parked.
$T_{Pmax}$ Preestablished threshold of time spent parked.
$\theta_{int0}$ Initial temperature inside the tank.
$\theta_{S1}$ First preestablished temperature threshold.
$\theta_{S2}$ Second preestablished temperature threshold.
$\theta_{S3}$ Third preestablished temperature threshold.
$\theta_{exti}$ Temperature of the ambient air outside the tank for a time interval $\Delta T_i$ considered.
$V_0$ Initial volume in liquid form.
$V_R$ Value for liquid refrozen during the time spent parked.
$\delta V_i$ Quantity of liquid frozen or thawed during the time interval $\Delta T_i$ considered.
$V_{WC}$ Estimated volume of thawed liquid present in the tank.
$V_{WCP}$ Estimated volume of liquid present in the tank at the moment of the previous stopping of the vehicle.
$V_{inf}$ Preestablished volume threshold.
$V_{act}$ Updated volume of liquid present in the tank as estimated using a submerged sensor.
$V_{Inj}$ Volume of liquid injected by the injection pump during the time interval $\Delta T_i$ considered.
$\zeta$ Signal from a submerged sensor.

The invention claimed is:

1. A method for estimating a volume of thawed liquid forming part of a content located inside a motor vehicle tank including at least one heating element arranged inside the motor vehicle tank, an inside thermometer positioned in the motor vehicle tank to measure a temperature $\theta_{int0}$ of a liquid thawed inside the tank, an outside thermometer positioned out of the motor vehicle tank to measure a motor vehicle temperature $\theta_{exti}$ of an ambient air outside the motor vehicle, at least one of submerged level sensors, a motor vehicle speed measuring means, a computer processing unit for calculating estimated values of the volume of thawed liquid and acquiring actual values of an inside temperature of the content of the motor vehicle tank, an outside temperature of the ambient air outside the motor vehicle, a motor vehicle speed, a liquid level, via data interchange means connected to the inside thermometer, the outside thermometer, the at least one submerged sensors, the motor vehicle speed measuring means, and including a means for storing a first pre-established relationship, a second pre-established relationship, a third pre-established relationship, pre-established values and variable values, the method comprising:

determining, the motor vehicle having started, during a regular time intervals ($\Delta T_i$);

detecting the actual temperature ($\theta_{exti}$) of the ambient aft outside the motor vehicle via the outside thermometer;

estimating a heat-energy transfer ($\delta E_S$) between the content of the motor vehicle tank and external surroundings by using the first pre-established relationship based on the actual temperature ($\theta_{exti}$) of the ambient aft outside the motor vehicle;

estimating a heat-energy transfer ($\delta E_E$) between the at least one heating element and the contents of the motor vehicle tank using the second preestablished relationship ($R_2(W)$) based on a power (W) produced by the at least one heating element;

estimating a quantity ($\delta V_i$) of at least one of a thawed liquid and a refrozen liquid during the regular time interval ($\Delta T_i$) using a third preestablished relationship ($R_3(\delta E_i)$), based on the energy transfers ($\delta E_i = \delta E_S + \delta E_E$) having been determined; and estimating a volume of the thawed liquid present in the motor vehicle tank ($V_{wc} = \Sigma \delta V_i$), based on a sum of the quantity of the thawed liquid and the quantity of the refrozen liquid during preceding successive time intervals.

2. The method as claimed in claim 1, further comprising:
detecting an initial temperature ($\theta_{int0}$) inside the motor vehicle tank via the inside thermometer;

comparing said initial temperature ($\theta_{int0}$) to pre-established temperature thresholds ($\theta_{S1}$, $\theta_{S2}$, $\theta_{S3}$); and determining an activation of the at least one heating element, and estimating an initial volume ($V_0$) in liquid form present in the motor vehicle tank and a dead time ($T_{DT}$) at the end of which an actual temperature ($\theta_{exti}$) of the ambient air outside the motor vehicle via the outside thermometer is determined for a first time interval ($\Delta T_1$), based on a function of a time ($T_P$) for which the motor vehicle spent parked, and of a volume of liquid ($V_{wcp}$) being present in the motor vehicle tank when the motor vehicle has been stopped before being parked.

3. The method as claimed in claim 2, wherein determining the activation of the at least one heating element, the value of the initial volume ($V_0$) in liquid form present in the motor vehicle tank and the dead time ($T_{DT}$) is executed in:

i. activating said at least one heating element
if the initial temperature ($\theta_{int0}$) inside the motor vehicle tank is above a first given threshold ($\theta_{S1}$), the initial volume ($V_0$) is equal to an updated volume ($V_{act}$) ($V_0 = V_{act}$) and the dead time ($T_{DT}$) is equal to zero ($T_{DT} = 0$), or if the initial temperature ($\theta_{int0}$) inside the motor vehicle tank is below the first given threshold ($\theta_{S1}$) greater than or equal to a second given threshold ($\theta_{S2}$) the at least one heating element is activated; and ii. estimating via the computer processing unit the dead time and the initial volume of the liquid
   if the initial temperature inside the motor vehicle tank ($\theta_{int0}$) is below a third given temperature threshold ($\theta_{S3}$) ($\theta_{Int0} < \theta_{S3}$), the initial volume ($V_0$) is equal to zero ($V_0=0$) and the dead time ($T_{DT}$) is equal to a predetermined value ($T_{DT}=T_0$), or
   if the initial temperature inside the motor vehicle tank ($\theta_{int0}$) is comprised ($\theta_{S3} < \theta_{Int0} < \theta_{S2}$) between the third temperature threshold ($\theta_{S3}$) and a second given temperature threshold ($\theta_{S2}$) higher than the third threshold ($\theta_{S3}$),
iii. estimating the quantity of the liquid at the moment of the previous stopping of the motor vehicle
   if an estimated volume of liquid present in the motor vehicle tank at the moment of the previous stopping of the vehicle ($V_{WCP}$) is below a given threshold ($V_{inf}$) ($V_{WCP} < V_{inf}$), the initial volume ($V_0$) is equal to zero ($V_0=0$) and the dead time ($T_{DT}$) is equal to said predetermined value ($T_{DT}=T_0$), or
   if said estimated volume of liquid present in the tank at the moment of the previous stopping of the vehicle ($V_{WCP}$) is above said given threshold ($V_{inf}$) ($V_{WCP} < V_{inf}$),
iv. estimating the quantity of the liquid after the vehicle having parked
   if the time for which the vehicle has been parked ($T_p$) is above a given threshold ($T_{Pmax}$), the value of the initial volume ($V_0$) is equal to zero ($V_0=0$), and the dead time ($T_{DT}$) is equal to zero, or
   if the time for which the vehicle has been parked ($T_p$) is below said given threshold ($T_{Pmax}$), the initial volume ($V_0$) is equal to the estimated volume ($V_{WCP}$) of liquid present in the motor vehicle tank at the moment of the previous stopping of the vehicle decreased by a volume ($V_R$) of liquid that has refrozen during the time for which the volume has been parked ($V_0=V_{WCP}-V_R$), and the dead time ($T_{DT}$) is equal to zero ($T_{DT}=0$).

4. The method as claimed in claim 2, further comprising: increasing the estimated volume of thawed liquid present in the motor vehicle tank by the value of the initial volume ($V_{WC}=V_0+\Sigma\delta V_i$).

5. The method as claimed in claim 1, further comprising: obtaining a signal ($\zeta$) from at least one level sensor present in the motor vehicle tank during the regular time interval ($\Delta T_i$); and
assessing a validity of the signal:
   if the signal ($\zeta$) is valid,
      evaluating an updated value ($V_{act}$) for the volume of the liquid present in the motor vehicle tank via said at least one level sensor, and
      replacing the value of the estimated volume of thawed liquid ($V_{WCP}$) obtained at the end of the regular time interval ($\Delta T_i$) with said updated volume value ($V_{act}$), or
   if the signal ($\zeta$) is invalid
      retaining the value for the estimated volume of the thawed liquid ($V_{WC}$) having been obtained at the end of the regular time interval ($\Delta T_i$); and
      repeating determining the actual temperature of the ambient air outside the motor vehicle tank via the outside thermometer for a subsequent regular time interval ($\Delta T_i$).

6. The method as claimed in claim 1, wherein the pre-established first relationship ($R_1(\theta_{exti}, S_i)$) is dependent on the external actual temperature ($\theta_{exti}$) and on the motor vehicle speed ($S_i$) which is obtained during determining the heat energy transfer between contents of the motor vehicle tank and the external surroundings.

7. The method as claimed in claim 1, wherein:
   first pre-established relationship ($R_1(\theta_{exti})$) to determine a heat-energy transfer ($\delta E_S$) between the contents of the motor vehicle tank and the external surroundings,
   the second preestablished relationship ($R_2(W)$) to determine a heat-energy transfer ($\delta E_E$) between the at least one heating element and the contents of the motor vehicle tank, and
   the third preestablished relationship ($R_3(\delta Ei)$) to determine the quantity ($\delta Vi$) of the thawed liquid and the refrozen liquid,
   are established experimentally.

8. The method as claimed in claim 1, wherein the liquid contained in the motor vehicle tank is at least one of water, urea dissolved in water, a ternary mixture made up of water, urea, and an alcohol.

9. The method as claimed in claim 8, wherein the alcohol forming the ternary mixture is selected from at least one of methanol, ethanol, ethylene glycol, and isopropanol.

10. A motor vehicle comprising a motor vehicle tank for storing a liquid comprising:
   at least one heating element;
   an inside thermometer positioned inside the motor vehicle tank to measure a temperature ($\theta_{int0}$) of the liquid inside the motor vehicle tank;
   an outside thermometer positioned out of the motor vehicle tank to measure a temperature ($\theta_{exti}$) of an ambient air outside the motor vehicle;
   at least one of submerged sensors;
   a motor vehicle speed measuring means;
   a computer processing unit connected by data interchange means to the inside thermometer, the outside thermometer the at least one of the submerged sensors the motor vehicle speed measuring means and comprising a means for storing a first preestablished relationship, a second preestablished relationship, a third preestablished relationship, pre-established values and variable values and coded instructions loaded into the computer processing unit to:
      determine, the motor vehicle having started, during a regular time interval ($\Delta_{ti}$) an actual temperature ($\theta$exti) of the ambient air outside the motor vehicle tank via the outside thermometer;
      estimate a heat-energy transfer ($\delta E_S$) between a content of the motor vehicle tank of and external surroundings by using the first pre-established relationship based on the actual temperature ($\theta_{exti}$) of the ambient air outside the motor vehicle;
      estimate a heat-energy transfer ($\delta E_E$) between the at least one heating element and the content of the motor vehicle tank using the second preestablished relationship ($R_2(W)$) based on a power (W) produced by the at least one heating element;
      estimate a quantity ($\delta V_i$) at least one of a thawed liquid and a refrozen liquid during the regular time interval ($\Delta Ti$) using the third preestablished relationship ($R_3(\delta E_i)$), based on the energy transfers ($\delta E_i=\delta E_S+\delta E_E$) having been determined; and
      estimate a volume of the thawed liquid present in the motor vehicle tank ($V_{WC}=\Sigma\delta V_i$) based on a sum of the quantity of the thawed liquid and the quantity of the refrozen liquid during preceding successive time intervals.

* * * * *